(12) United States Patent
Ichinose et al.

(10) Patent No.: US 8,263,684 B2
(45) Date of Patent: Sep. 11, 2012

(54) COATING COMPOSITION, COATING FILM, AND METHOD OF REDUCING UNDERWATER FRICTION

(75) Inventors: Yoshifumi Ichinose, Tokyo (JP); Isamu Onishi, Osaka (JP); Naoki Yamamori, Osaka (JP); Kazuaki Masuda, Osaka (JP)

(73) Assignee: Nippon Paint Co., Ltd., Kita-ku, Osaka-shi (JP)

( * ) Notice: Subject to any disclaimer, the term of this patent is extended or adjusted under 35 U.S.C. 154(b) by 633 days.

(21) Appl. No.: 11/569,643

(22) PCT Filed: May 26, 2005

(86) PCT No.: PCT/JP2005/009696
§ 371 (c)(1),
(2), (4) Date: Jul. 6, 2007

(87) PCT Pub. No.: WO2005/116155
PCT Pub. Date: Dec. 8, 2005

(65) Prior Publication Data
US 2007/0272119 A1 Nov. 29, 2007

(30) Foreign Application Priority Data
May 26, 2004 (JP) ................................. 2004-156756

(51) Int. Cl.
*B05D 5/08* (2006.01)
(52) U.S. Cl. ..... 523/175; 106/16; 106/15.05; 106/18.32
(58) Field of Classification Search .................. 523/175, 523/122
See application file for complete search history.

(56) References Cited

U.S. PATENT DOCUMENTS

| | | | | |
|---|---|---|---|---|
| 4,137,208 A | * | 1/1979 | Elliott | 524/475 |
| 5,167,707 A | * | 12/1992 | Freeman et al. | 106/416 |
| 5,476,056 A | | 12/1995 | Tokunaga et al. | |
| 5,770,188 A | * | 6/1998 | Hamade et al. | 424/78.09 |
| 5,985,434 A | * | 11/1999 | Qin et al. | 428/315.5 |
| 6,579,606 B1 | | 6/2003 | Uchiya et al. | |
| 2003/0139558 A1 | | 7/2003 | Yamamori et al. | |
| 2003/0183125 A1 | * | 10/2003 | Yamamori et al. | 106/36 |
| 2004/0029997 A1 | * | 2/2004 | Yamamori et al. | 523/122 |

FOREIGN PATENT DOCUMENTS

| | | |
|---|---|---|
| CN | 1192766 A | 9/1998 |
| CN | 1446860 A | 10/2003 |
| EP | 0259096 A1 | 3/1988 |
| GB | 2316633 A | 3/1998 |
| JP | 58-183762 A | 10/1983 |
| JP | 61-36376 A | 2/1986 |
| JP | 62-57464 A | 3/1987 |
| JP | 62-78283 A | 4/1987 |
| JP | 63-105075 A | 5/1988 |
| JP | 3-024502 A | 2/1991 |
| JP | 3-024502 A | 4/1991 |
| JP | 04120183 | 4/1992 |
| JP | 5-86309 A | 4/1993 |
| JP | 5-112741 A | 5/1993 |
| JP | 5-112741 A | 5/1993 |
| JP | 5-271570 A | 10/1993 |
| JP | 7-17476 A | 1/1995 |
| JP | 7-54277 A | 2/1995 |
| JP | 7-109436 A | 4/1995 |
| JP | 09157573 | 6/1997 |
| JP | 9-297248 A | 11/1997 |
| JP | 09-309785 A | 12/1997 |
| JP | 10-259347 A | 9/1998 |
| JP | 11-29725 A | 2/1999 |
| JP | 11-29747 A | 2/1999 |
| JP | 11-256077 A | 9/1999 |
| JP | 2001-98007 A | 4/2001 |
| JP | 20011040274 A * | 4/2001 |
| JP | 2001342432 | 12/2001 |
| JP | 2003-277691 A | 10/2003 |
| TW | I290148 B | 11/2007 |

OTHER PUBLICATIONS

Lewis, Richard J., Sr. "Particle" in Hawley'S Condensed Chemical Dictionary, 14th ed. (2002).*
Masuda, "Polymeric New Material One Point-4 High-absorbent Polymers", Nov. 15, 1987.
Office Action issued in related Taiwan Application No. 094117356 on Dec. 29, 2011 (with its English language translation).
Office Action issued in related Japanese Application No. 2006-513954 on Jan. 17, 2012 (with its English language translation).
Chinese Office Action in Counterpart of 200580016706.6 Dated Nov. 6, 2009.

\* cited by examiner

Primary Examiner — Doris Lee
(74) Attorney, Agent, or Firm — Connolly Bove Lodge & Hutz LLP

(57) ABSTRACT

It is an object of the present invention to provide a coating composition which can attain low friction performance without impairing the functions of a conventional coating composition, a coated film formed by using the same and a method of reducing friction in water.

A coating composition containing an organic polymer particle,
wherein said organic polymer particle has the solubility at 23° C. in the artificial seawater specified in ASTM D1141-98 of 15 g/liter or less, the water-absorbing amount for the artificial seawater specified in ASTM D1141-98 of 0.01% by mass or more and a particle diameter of 0.05 to 100 μm.

18 Claims, No Drawings

COATING COMPOSITION, COATING FILM, AND METHOD OF REDUCING UNDERWATER FRICTION

CROSS-REFERENCE TO RELATED APPLICATIONS

This application is a National Stage of PCT/JP2005/009696 filed May 26, 2005 which in turn claims priority from Japanese Application 2004-156756, filed May 26, 2004.

TECHNICAL FIELD

The present invention relates to a coating composition, a coated film and a method of reducing friction in water.

BACKGROUND ART

Marine life such as acorn barnacle, mussel and algae tend to adhere to underwater structures such as a marine vessel, a fishing net and the like, and this causes a problem of interfering with efficient navigations to result in a waste of fuel in the marine vessels and a problem of clogging a net or shortening a useful life of a net in the fishing nets. In order to prevent the marine life from adhering to these underwater structures, an antifouling coating composition is generally applied onto the surfaces of the underwater structures as described in Japanese Kokai Publication Sho62-57464.

On the other hand, when like marine vessels, coating is applied to a location where friction occurs between the vessel and liquid, it is desired to reduce frictional resistance between the vessel and liquid by a coated film from the viewpoint of a reduction in navigation fuel to be consumed of the marine vessels and energy conservation.

A coating composition aimed at reducing such frictional resistance is disclosed in Japanese Kokai Publication Hei11-29725, Japanese Kokai Publication Hei11-29747, Japanese Kokai Publication 2001-98007, Japanese Kokai Publication Hei11-256077, Japanese Kokai Publication Hei10-259347 and Japanese Kokai Publication 2003-277691. In these patents, a resin composition for a coating composition, which uses a polymer such as an acrylic resin, a polyoxyethylene chain-containing polymer, an allylamine resin, chitin or chitosan as a resin binder in a coating composition, is disclosed.

But, these coating compositions are not those which reduce frictional resistance by resin particles added to a coated film.

In Japanese Kokai Publication Hei5-86309 and Japanese Kokai Publication Hei5-112741, it is described that a coated film of low frictional resistance can be attained by forming a coated film with an antifouling coating composition in which inorganic fine particles are mixed. However, these coated films have some frictional resistance effects in marine vessels moving at a low speed but they cannot attain adequate frictional resistance effects in marine vessels moving at a high speed and their effects are insufficient.

DISCLOSURE OF THE INVENTION

Problem to be Solved by the Invention

In view of the above state of the art, it is an object of the present invention to provide a coating composition which can attain low friction performance without impairing the functions of a conventional coating composition, a coated film formed by using the same and a method of reducing friction in water.

Means for Solving the Problem

The present invention pertains to a coating composition containing an organic polymer particle, wherein said organic polymer particle has the solubility at 23° C. in the artificial seawater specified in ASTM D1141-98 of 15 g/liter or less, the water-absorbing amount for the artificial seawater specified in ASTM D1141-98 of 0.01% by mass or more and a particle diameter of 0.05 to 100 μm.

The organic polymer particle may be a nature-derived polymer.

Preferably, the organic polymer particle has a cationic group.

The present invention pertains to a coating composition containing at least one species of an organic polymer particle, having a particle diameter of 0.05 to 100 μm, selected from the group consisting of chitin, chitosan, γ-PGA, pulverized silk and derivatives thereof.

Preferably, the organic polymer particle is a synthetic polymer.

Preferably, the organic polymer particle is an acrylic resin particle.

The present invention pertains to a coating composition containing a composite resin particle consisting of a hydrophilic resin and an acrylic resin, having a particle diameter of 0.05 to 100 μm.

Preferably, the hydrophilic resin is at least one species of hydrophilic resin selected from the group consisting of starch, pullulan, gum arabic, κ-carrageenan, gelatin, cellulose, chitosan and derivatives thereof, polyvinyl alcohol, polyallylamine, polyvinylamine, poly(meth)acrylamide, and poly(meth)acrylic acid and copolymer thereof.

Preferably, the content of the organic polymer particle is 0.01 to 15% by mass with respect to the solid matter of a coating composition.

Preferably, the coating composition contains an acrylic resin and/or a polyester resin having a side chain expressed by the following general formula (1);

—C(=O)—O-M-OC(=O)-A  (1), wherein M is a divalent or higher valent metal and A is an organic acid residue of a monobasic acid.

Preferably, the coating composition contains an acrylic resin and/or a polyester resin having a side chain expressed by the following general formula (2);

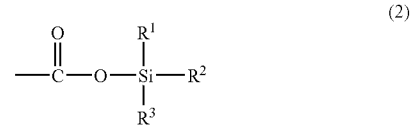

(2)

wherein $R^1$, R and $R^3$ are the same or different from one another and represent an isopropyl group or a n-butyl group.

Preferably, the coating composition contains an acrylic resin and/or a polyester resin having at least one group expressed by said general formula (1) on the side chain and having at least one group expressed by said general formula (2) on the side chain.

Preferably, the coating composition is an antifouling coating composition.

The present invention pertains to a coated film formed by using the above-mentioned coating composition.

The present invention pertains to a method of reducing friction in water, comprising a step of forming the above-mentioned coated film on the surface of a substance to be coated.

Hereinafter, the present invention will be described in detail.

The coating composition of the present invention has good low friction performance by containing the organic polymer particle having the above features. That is, the coating composition of the present invention has an excellent property that a low friction coated film can be readily formed by adding the organic polymer particle having the above features as an additive.

The present invention has been achieved by finding that the function of reducing friction is attained by adding resin particles having specific properties. That is, the coating composition of the present invention can form a coated film having a function of reducing friction irrespective of a chemical structure of a resin to form the coated film. An organic polymer particle which can be used for the object of the present invention is as follows described in detail below.

An organic polymer particle which can be used for the object of the present invention Is an organic polymer particle having the solubility at 23° C. in the artificial seawater specified in ASTM D1141-98 of 15 g/liter or less, the water-absorbing amount for the artificial seawater specified in ASTM D1141-98 of 0.01% by mass or more and a particle diameter of 0.05 to 100 μm. That is, when the organic polymer particle satisfying the above-mentioned properties is used, desired properties can be attained irrespective of a chemical structure of the polymer.

In addition, in this description, the artificial seawater specified in ASTM D1141-98 was used as standard water for determining the solubility and the water-absorbing amount. Since a coated film formed from the coating composition of the present invention is predominantly used in seawater, it is necessary to measure the above-mentioned solubility and water-absorbing amount using not pure water but seawater as standard water.

The above-mentioned organic polymer particle in the present invention is an organic polymer particle having the solubility at 23° C. in the artificial seawater specified in ASTM D1141-98 of 15 g/liter or less. When the above-mentioned solubility is more than 15 g/liter, adequate low friction performance cannot be exerted. That is, when the solubility of the above organic polymer particle in seawater is too high, the organic polymer particle is readily dissolved in seawater and runs off from the surface of the coated film. Therefore, it is necessary that the above organic polymer particle has the solubility of 15 g/liter or less. The above solubility is preferably 12 g/liter or less. Incidentally, the above solubility is a value obtained by drying the organic polymer particle at room temperature under a reduced pressure, weighing the dried particle, and measuring the solublity of the particle in the artificial seawater prepared according to ASTM D11441-98.

The water-absorbing amount of the above organic polymer particle for the artificial seawater specified in ASTM D1141-98 is 0.01% by mass or more. When the above-mentioned water-absorbing amount is less than 0.01% by mass, compatibility with seawater is low and therefore adequate effect cannot be attained and reduction in friction is suppressed. Since the organic polymer particle used in the present invention has a property of swelling when contacting with water and not dissolving in water, it can suitably exert low friction performance. The above water-absorbing amount is preferably 0.1% by mass or more.

In addition, the water-absorbing amount in the present invention was determined by the operational procedures in which 1 g of organic polymer particles dried at room temperature in a vacuum (under a reduced pressure) were precisely weighed out, and the particles were put in 50 g of artificial seawater prepared according to ASTM D1141-98 and stirred at 23° C. for 5 hours, and the particles were filtered and a residue was washed with water to be weighed.

Furthermore, the particle diameter of the above organic polymer particle is in the range from 0.05 μm of a lower limit to 100 μm of an upper limit. When the above particle diameter is smaller than 0.05 μm, an adequate effect of reducing friction cannot be attained. When it is larger than 100 μm, a problem that the surface condition is deteriorated in swelling in the seawater arises. Preferably, the above lower limit is 0.1 μm and the above upper limit is 40 μm. More preferably, the above lower limit is 1 μm and the above upper limit is 30 μm. In addition, the above-mentioned particle diameter refers to a weight average particle diameter measured through light scattering or laser scattering.

The above organic polymer particle may be a nature-derived polymer or a synthetic polymer as long as it has the above-mentioned properties. Preferably, the polymer having the above-mentioned properties has an appropriate amount of a hydrophilic functional group and has a crosslinking chain as required. Examples of the above-mentioned hydrophilic functional group include a hydroxyl group, an amino group, a carboxyl group, an amide group, and a polyoxyethylene group. A high water-absorbing amount can be attained by containing a hydrophilic group, but the hydrophilicity becomes too high and therefore the solubility in seawater may become too high. When the hydrophilicity becomes too high, the solubility in artificial seawater can be adjusted by introducing a hydrophobic group or crosslinking.

Examples of a nature-derived polymer which can be used as the organic polymer particle of the present invention include polysaccharides such as chitin, chitosan, gum arabic, alginic acid, carrageenan, agar, xanthan gum, gellan gum, cellulose, xylose, starch, pullulan, pectin, roast bean gum, dextran and curdlan; proteins such as keratin, collagen, silk and γ-polyglutamic acid (hereinafter, referred to as γ-PGA); and nucleic acid. And, nature-derived polymers also include derivative compounds such as semi-synthetic polymers have become hydrophilic (for example, hydroalkylated), have been converted to polyethylene glycol, have become hydrophobic (for example, alkylated), have been grafted, or have become three-dimensional by hydrolyzing or crosslinking these nature-derived polymers as required.

The above-mentioned nature-derived polymer preferably has a cationic group. It is assumed that an elution rate into seawater can be controlled by having the cationic group. The above-mentioned cationic group is not particularly limited and includes, for example, an amino group, an amide group and a pyridine group. A natural polymer inherently containing a cationic group may be used or when a polymer not containing a cationic group is used, this polymer is modified to a derivative and a cationic group may be introduced into the derivative.

The above-mentioned organic polymer particle is more preferably at least one species of an organic polymer particle selected from the group consisting of chitin, chitosan, γ-PGA, pulverized silk and derivatives thereof.

The above-mentioned chitin is polysaccharide and a deacetylation product thereof is chitosan. The above-mentioned deacetylation may be perfect deacetylation or may be partial deacetylation. The polysaccharide may be modified or crosslinked with polyoxyethylene or an aldehyde group-containing compound as required.

The above-mentioned pulverized silk is formed by pulverizing silk which is a cocoon filament produced by a silkworm into particles. It is assumed that fibroin or sericin of a nature-derived polymer, contained in silk as a main ingredient, has an effect described above in the present invention.

The pulverized silk used in the present invention may be a particle obtained by pulverizing natural silk directly or a particle obtained by removing contaminant components, hydrolyzing, purifying and classifying natural silk as required.

γ-PGA is a polymer expressed by the following general formula (3);

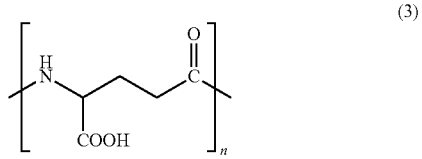

As a familiar example, a polymer which is a main component of glutinosity produced by bacillus natto and is noted as a polymer absorber material, a biodegradable material, a medical material, a food additive or a cosmetic material is given. γ-PGA particle used in the present invention is formed by drying nature-derived substances produced by the above fungus and pulverizing them into particles. The above-mentioned γ-PGA particle may be a particle obtained by removing contaminant components, hydrolyzing, purifying and classifying γ-PGA as required.

As the above organic polymer particle in the present invention, a synthetic polymer can also be used. The above-mentioned synthetic polymer is not particularly limited and examples of the synthetic polymer include an acrylic resin, a polyester resin, an amine resin and a modified polyvinyl alcohol resin. These synthetic polymers are preferably a hydrophilic resin having hydrophilic groups such as a hydroxyl group, an amino group and a carboxyl group, and preferably partially has a crosslinking structure as required in order to control the solubility in seawater. By adjusting the hydrophilicity/hydrophobicity and a proportion of crosslinking by a publicly known method, the synthetic polymer having the above-mentioned properties can be attained.

As the synthetic polymer having the above-mentioned properties, particularly, an acrylic resin particle can be suitably used. Examples of the above acrylic resin particles include an acrylic resin particles obtained by polymerizing a monomer composition comprising an acrylic monomer and a crosslinkable monomer as required by emulsion polymerization or the like.

The above-mentioned acrylic resin particle can be obtained, for example, by emulsion polymerization of a monomer composition containing an acrylic monomer and a crosslinkable monomer.

The above-mentioned acrylic monomer is not particularly limited and includes, for example, alkyl esters of acrylic acid or methacrylic acid such as methyl(meth)acrylate, ethyl (meth)acrylate, n-butyl(meth)acrylate, isobutyl(meth)acrylate and 2-ethylhexyl(meth)acrylate; hydroxyl group-containing (meth)acrylate such as 2-hydroxyethyl(meth) acrylate, 2-hydroxypropyl(meth)acrylate and 2-hydroxyethyl(meth)acrylate; and acrylonitrile, methacrylonitrile and dimethylaminoethyl(meth)acrylate.

In the above emulsion polymerization, other ethylenic unsaturated monomers may be used. The above-mentioned ethylenic unsaturated monomer is not particularly limited and includes, for example, styrene, α-methylstyrene, vinyl toluene, t-butylstyrene, vinyl acetate, and vinyl propionate. The above-mentioned acrylic monomers and ethylenic unsaturated monomers may be used singly or in combination of two or more species.

The above-mentioned crosslinkable monomer is not particularly limited and includes, for example, a monomer having two or more radically polymerizable ethylenic unsaturated bonds in a molecule.

The above-mentioned monomer, having two or more radically polymerizable ethylenic unsaturated bonds in a molecule which can be used for the production of the above acrylic resin particle, is not particularly limited and includes, for example, polymerizable unsaturated monocarboxylic acid ester of polyhydric alcohol such as ethyleneglycol diacrylate, ethyleneglycol dimethacrylate, triethyleneglycol dimethacrylate, tetraethyleneglycol dimethacrylate, 1,3-butyleneglycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacrylate, 1,1,1-tris(hydroxymethyl) ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris (hydroxymethyl)propane diacrylate, 1,1,1-tris(hydroxymethyl)propane triacrylate, 1,1,1-tris(hydroxymethyl)propane dimethacrylate and 1,1,1-tris(hydroxymethyl)propane trimethacrylate; polymerizable unsaturated alcohol ester of polybasic acid such as triallyl cyanurate, triallyl isocyanurate, triallyl trimelitate, diallyl terephthalate and diallyl phthalate; and aromatic compounds substituted by two or more vinyl groups such as divinylbenzene.

In the above-mentioned monomer composition, an amount of the above crosslinkable monomer is preferably 1% by mass or more with respect to the total amount of the monomer composition. When the above percentage by mass is out of the above range, there is a possibility that desired acrylic resin particle cannot be obtained. The above percentage by mass is more preferably 5 to 70% by mass.

A method of polymerizing the above-mentioned monomer composition is not particularly limited and a publicly known method such as emulsion polymerization and suspension polymerization can be employed.

The above organic polymer particle may be a composite resin particle containing two or more species of polymers. The term a composite resin particle containing two or more species of polymers refers to a particle formed by using two or more species of various nature-derived polymers and synthetic polymers described above and specific measure for forming a composite particle is not particularly limited and includes any technique such as mixing, grafting, core-shell forming, INP (interpenetrating polymer network) forming and surface treating.

The above-mentioned two or more species of polymers are not particularly limited and examples of these polymers include the nature-derived polymer described above and the above synthetic polymers. The above-mentioned organic polymer particle is preferably a composite resin particle, in particular, containing at least one species of hydrophilic resin selected from starch, pullulan, gum arabic, κ-carrageenan, gelatin, cellulose, chitosan and derivatives thereof, polyvinyl alcohol, polyallylamine, polyvinylamine, poly(meth)acrylamide, and poly(meth)acrylic acid and copolymer thereof and an acrylic resin. When such a combination is employed, it is preferred in that hydrophilicity can be attained while changing the properties of a particle at request by the composition of the acrylic resin. The above hydrophilic resin and acrylic resin may be used in the form of combining resins among which a resin alone cannot achieve the object of the present invention. As the above hydrophilic resin, at least one resin selected from chitosan, chitosan derivatives, and polyvinyl alcohol is preferably used.

The above-mentioned composite resin particle containing the hydrophilic resin and the acrylic resin can be obtained, for example, by polymerizing a raw material monomer of an acrylic resin by emulsion polymerization or suspension polymerization in the presence of the above hydrophilic resin. As an emulsifier used in polymerization, a publicly known emulsifier can be used, but a reactive emulsifier is preferred from the viewpoint of water resistance and adhesion to a substrate.

The above-mentioned reactive emulsifier is a surfactant having $\alpha,\beta$-ethylenic unsaturated bond and it is classified into 4 types of an anion type, a cation type, a nonion type and an amphoteric type. Examples of an anion type emulsifier among commercially available products as the above reactive emulsifier include ELEMINOL JS series (produced by Sanyo Chemical Industries, Ltd.), LATEMUL S series and ASK series (produced by Kao Corporation), AQUARON HS series (produced by DAI-ICHI KOGYO SEIYAKU CO., LTD.), ADEKA REASOAP SE series and SR series (produced by Asahi Denka CO., LTD.) and ANTOX MS-60 (produced by NIPPON NYUKAZAI CO., LTD.). And, examples of a cation type emulsifier include as LATEMUL K series (produced by Kao Corporation), and further examples of a nonion type emulsifier include AQUARON series (produced by DAI-ICHI KOGYO SEIYAKU CO., LTD.) and ADEKA REASOAP NE series and ER series (produced by Asahi Denka CO., LTD.)

An amount of the above reactive emulsifier to be added is preferably 15% by mass or less. When this amount is more than 15% by mass, the water resistance of a coated film obtained from the coating composition containing composite resin particles may be deteriorated.

In the synthesis of the above-mentioned composite resin particle, a mixing ratio of a monomer composition being a raw material of acrylic resin to a hydrophilic resin is preferably 40/60 to 97/3 in a mass ratio (solid matter).

The content of the above organic polymer particle in the coating composition of the present invention is preferably in the range from 0.01% by mass of a lower limit to 15% by mass of an upper limit with respect to the total solid matter in a coating composition. When the above content is less than 0.01% by mass, a desired effect is not attained and it is not preferred. When the above content is more than 15% by mass, it cannot be expected to exert an effect further and it is uneconomic and cracks of a coated film may occur due to swelling of particles. More preferably, the above lower limit is 0.1% by mass and the above upper limit is 12% by mass.

In addition, the coating composition of the present invention may contain one or more species of the above organic polymer particles.

The coating composition of the present invention can be applicable to any one of a water-borne coating composition, a NAD type coating composition and a solvent-borne coating composition but it is necessary that the organic polymer particle is dispersed in water or a solvent without being dissolved in water or a solvent.

The coating composition of the present invent-on contains a resin binder in addition the above organic polymer particle. The above-mentioned resin binder is not particularly limited and it can be appropriately selected in accordance with a desired purpose.

When the coating composition of the present invention is used as an antifouling coating composition, various resins having an antifouling property publicly known in the coating compositions having an antifouling property can be used as the above-mentioned resin binder. The above-mentioned resin having an antifouling property is not particularly limited and includes, for example, an acrylic resin and/or a polyester resin having a side chain expressed by the above general formula (1) (an acrylic resin and/or a polyester resin (I)), an acrylic resin and/or a polyester resin having a side chain expressed by the above general formula (2) (an acrylic resin and/or a polyester resin (II)), an acrylic resin and/or a polyester resin having at least one group expressed by the above general formula (1) on the side chain and having at least one group expressed by the above general formula (2) on the side chain (an acrylic resin and/or a polyester resin (III)), rubber chloride, polyvinyl acetate, polyalkyl(meth)acrylate, an alkyd resin, a polyester resin and polyvinyl chloride. The above coating composition may contain additives such as a silicon oil, wax, vaseline, liquid paraffin, rosin, hydrogenated rosin, naphthenic acid, fatty acid and divalent metal salt therof, paraffin chlorinated, polyvinyl ether, polypropylene sebacate, partially hydrogenated terphenyl and polyether polyol as required. These resin binders or additives may be used singly or in combination of two or more species.

The above-mentioned acrylic resin and/or polyester resins (I), (II) and (III) are referred to as a self-polishing type polymer and it has a function of preventing the adhesion of aquatic life such as acorn barnacle and the like through the gradual dissolution of a resin by being subjected to hydrolysis in seawater. When these self-polishing type polymers are used, the above organic polymer particle exposed to the surface is released into water as a resin binder is eluted. Thereby, new organic polymer particle will be exposed to the surface. Since the new organic polymer particle is always exposed to the surface by such an action, an effect of reducing friction can be exerted for a long term even though the organic polymer particle varies in the seawater.

The above-mentioned acrylic resin and/or polyester resin (I) is an acrylic resin and/or a polyester resin having at least one group expressed by the above general formula (I) on the side chain of the acrylic resin and/or the polyester resin and it can be produced, for example, by a method 1 of reacting a resin obtained by copolymerizing a polymerizable unsaturated organic acid and other copolymerizable unsaturated monomer with a metal compound and a monobasic acid or reacting by ester exchange using metal ester of a monobasic acid, or a method 2 of copolymerizing a metal-containing polymerizable unsaturated monomer and other copolymerizable unsaturated monomer.

The above-mentioned polymerizable unsaturated organic acid is not particularly limited and includes, for example, acids having one or more carboxyl groups, and examples of such the acids include, for example, unsaturated monobasic acids such as (meth)acrylic acid; unsaturated dibasic acids and monoalkyl ester thereof such as maleic acid and monoalkyl ester thereof, and itaconic acid and monoalkyl ester thereof; and dibasic acid adducts of unsaturated monobasic acid-hydroxyalkyl ester such as maleic acid adduct of 2-hydroxyethyl(meth)acrylate, phthalic acid adduct of 2-hydroxyethyl(meth)acrylate and succinic acid adduct of 2-hydroxyethyl(meth)acrylate. These polymerizable unsaturated organic acids may be used singly or in combination of two or more species.

The above-mentioned other copolymerizable unsaturated monomer is not particularly limited and as (meth)acrylic acid esters include, for example, (meth)acrylic acid alkyl ester, in which an ester portion has 1 to 20 carbon atoms, such as methyl(meth)acrylate, ethyl(meth)acrylate, i-propyl(meth)acrylate, n-butyl(meth)acrylate, i-butyl(meth)acrylate, t-butyl(meth)acrylate, 2-ethylhexyl(meth)acrylate, lauryl(meth)acrylate and stearyl(meth)acrylate; hydroxyl group-containing (meth)acrylic acid-alkyl ester, in which an ester portion has 1 to 20 carbon atoms, such as 2-hydroxypropyl (meth)acrylate and 2-hydroxyethyl(meth)acrylate; (meth)acrylic acid-cyclic hydrocarbon ester such as phenyl(meth)acrylate and cyclohexyl(meth)acrylate; polyalkyleneglycol (meth)acrylate such as (poly)ethyleneglycol mono(meth)acrylate and polyethyleneglycol mono(meth)acrylate having a polymerization degree of 2 to 30; alkoxyalkyl(meth)acrylate having 1 to 3 carbon atoms such as methoxyethyl(meth)acrylate and (meth)acrylamide; vinyl compounds such as styrene, α-methylstyrene, vinyl acetate, vinyl propionate, vinyl benzoate, vinyl toluene and acrylonitrile; crotonic acid esters; and diesters of unsaturated dibasic acid such as maleic acid diesters and itaconic acid diesters. A ester portion of the above-mentioned (meth)acrylic acid esters is preferably an alkyl group having 1 to 8 carbon atoms and more preferably an alkyl group having 1 to 6 carbon atoms. Methyl(meth)acrylate, ethyl(meth)acrylate, butyl(meth)acrylate, and cyclohexyl(meth)acrylate are preferred. These copolymerizable unsaturated monomers may be used singly or in combination of two or more species.

The above acrylic resin and/or polyester resin (I) obtained by the above method 1 or method 2 has at least one group expressed by the above general formula (1), and in the above general formula (1), M is a divalent or higher valent metal and preferably copper or zinc.

The above-mentioned metal M is preferably contained in an amount 0.05% by mass of a lower limit to 20% by mass of an upper limit in the solid matter of the above acrylic resin and/or polyester resin (I). When this content is less than 0.05% by mass, even when a portion of metal salt in a coated film to be obtained is hydrolyzed, an elution in a resin is extremely low, and when it is more than 20% by mass, an elution rate of a coated film to be obtained is too fast, and therefore both cases are not preferred. The content more preferably has the lower limit of 0.5% by mass and the upper limit of 15% by mass.

The above-mentioned metal compound to be a source of the above metal M is not particularly limited and includes, for example, metal oxides, hydroxides, chlorides, sulfides, metal salt of organic acids and basic carbonate. These compounds may be used singly or in combination of two or more species.

In the above general formula (1), A is an organic acid residue of the above-mentioned monobasic acid, and the above monobasic acid is not particularly limited and includes, for example, a monobasic acid having 2 to 30 carbon atoms, and among others, a monobasic cyclic organic acid is preferred.

The above-mentioned monobasic cyclic organic acid is not particularly limited and includes, for example, an acid having a cycloalkyl group such as naphthenic acid as well as a resin acid such as tricyclic resin acid and salt thereof.

The above-mentioned tricyclic resin acid is not particularly limited and includes, for example, a monobasic acid having a diterpene hydrocarbon structure, and as such a compound, compounds having a structure of, for example, abiethane, pimarane, isopimarane or labdane are given, and example of such the compounds include abietic acid, neoabietic acid, dehydroabletic acid, hydrogenated abietic acid, palustric acid, pimaric acid, isopimaric acid, levopimaric acid, dextropimaric acid and sandaraco-pimaric acid. Among others, abietic acid, dehydroabietic acid, hydrogenated abietic acid and salt thereof are preferred because a prolonged antifouling property is excellent since hydrolysis is appropriately performed and the crack resistance of a coated film to be obtained and ease of availability are also excellent.

The above-mentioned monobasic cyclic organic acid does not need to be highly purified, and for example, pine rosin and a resin acid of pine can also be used. Examples of such a substance include rosins, hydrogenated rosins and disproportionated rosins. The term rosins refers to gum rosin, wood rosin, and tall oil rosin. Rosins, hydrogenated rosins and disproportionated rosins are preferable in that they are cheap and readily available and have an excellent handling property and exert a prolonged antifouling property. These monobasic cyclic organic acids may be used singly or in combination of two or more species.

Examples of a monobasic acid other than the above-mentioned monobasic cyclic organic acids among the monobasic acids which can be used in the present invention include monobasic acids having 1 to 30 carbon atoms such as acetic acid, (meth)acrylic acid, propionic acid, butyric acid, lauric acid, palmitic acid, 2-ethylhexanoic acid, stearic acid, linoleic acid, oleic acid, chloroacetic acid, fluoroacetic acid, valeric acid, versatic acid, 12-hydroxystearic acid and hydrogenated castor oil fatty acid. Monobasic acids having 5 to 20 carbon atoms are preferred. These monobasic acids may be used singly or in combination of two or more species.

In the above general formula (1), 5 mol % (lower limit) to 100 mol % (upper limit) of the organic acid residue of the monobasic acid is preferably a cyclic organic acid. It is preferred that the lower limit is 15 mol % and the upper limit is 100 mol %, and it is more preferred that the lower limit is 25 mol % and the upper limit is 100 mol %. When the percentage of the cyclic organic acid is less than 5 mol %, a prolonged antifouling property and the crack resistance of a coated film cannot be achieved simultaneously.

An acid value of a monobasic cyclic organic acid which is used in order to introduce the above-mentioned monobasic cyclic organic acid residue is in the range of 70 mg KOH/g of a lower limit to 300 mg KCH/g of an upper limit, and preferably in the range of 120 mg KOH/g of a lower limit to 250 mg KOH/g of an upper limit. When the acid value is within this range, an effect of antifouling can be maintained for a long term. More preferably, the lower limit is 120 mg KOH/g and the upper limit is 220 mg KOH/g.

In the above method 1, a number average molecular weight of a resin obtained by copolymerizing a polymerizable unsaturated organic acid and other copolymerizable unsaturated monomer is not particularly limited and it is preferably in the range from 2000 of a lower limit to 100000 of an upper limit, and more preferably in the range from 3000 of a lower limit to 40000 of an upper limit. When the number average molecular weight is less than 2000, a film forming property of a coated film may be deteriorated, and when it is more than 100000, not only it is impractical since the storage stability of a coating composition to be obtained is deteriorated, but also it is unfavorable in point of public health and economy since use of a large amount of a diluent solvent is required in coating process.

In the above method 1, a resin obtained by copolymerizing a polymerizable unsaturated organic acid and other copolymerizable unsaturated monomer preferably has an acid value of 70 to 300 mg KOH/g. When the acid value is less than 70, an amount of metal salt bonding to the side chain is small and an antifouling property may be low, and when it is more than 300, since an elution rate is too fast, a prolonged antifouling property is not expected.

In the above method 1, a method of reacting a resin obtained by copolymerizing a polymerizable unsaturated organic acid and other copolymerizable unsaturated monomer with a metal compound and a monobasic acid or a method of reacting by ester exchange using metal ester of a monobasic acid can be performed by a publicly known method, but heating/stirring is desirably carried out below a decomposition temperature of the metal ester.

The above-mentioned acrylic resin and/or polyester resin (II) is an acrylic resin and/or a polyester resin having at least one group expressed by the above general formula (2) on the side chain of the acrylic resin and/or the polyester resin and acrylic resin is preferred.

In the above general formula (2), $R^1$, $R^2$ and $R^3$ are the same or different from one another and represent an isopropyl group or an n-butyl group. All of the above-mentioned $R^1$, $R^2$ and $R^3$ are preferably an isopropyl group. Thereby, it is possible to maintain antifouling performance for a longer term in a coated film to be obtained.

As the acrylic resin of the above acrylic resin and/or polyester resin (II), for example, a resin obtained by a method of reacting a monomer component partially having a polymerizable unsaturated monomer and a tri-organosilyl group can be given, but a resin obtained by polymerizing tri-organosilyl (meth)acrylate expressed by the following general formula (4);

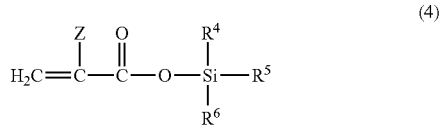

and other copolymerizable unsaturated monomer is preferred. The above-mentioned other copolymerizabie unsaturated monomer is not particularly limited and examples of the other copolymerizable unsaturated monomers include the monomer described in the description of the above acrylic resin and/or polyester resin (I) and the polymerizable unsaturated organic acid described in the description of the above acrylic resin and/or polyester resin (I). These polymerizable unsaturated organic acids and other copolymerizable unsaturated monomers may be used singly or in combination of two or more species.

In the tri-organosilyl(meth)acrylate expressed by the above general formula (4), Z represents a hydrogen atom or a methyl group. $R^4$, $R^5$ and $R^6$ are the same or different and represent an isopropyl group or an n-butyl group and all of the above-mentioned $R^4$, $R^5$ and $R^6$ are preferably an isopropyl group. Thereby, it is possible to maintain antifouling performance stably for a longer term and an antifouling coating composition to be obtained can be superior in storage stability.

Tri-organosilyl(meth)acrylate expressed by the above general formula (4) is preferably contained in an amount 5% by mass of a lower limit to 90% by mass of an upper limit in 100% by mass of the monomer component used for polymerization. When this content is more than 90% by mass, peeling may occur in a coated film, and when it is less than 5% by mass, a proportion of a tri-organosilyl group in a resin to be obtained becomes small and a prolonged antifouling property may not be expected. More preferably, the upper limit is 70% by mass and the lower limit is 10% by mass.

Specific examples of the above tri-organosilyl(meth)acrylate expressed by the general formula (4) include tri-i-propylsilyl(meth)acrylate and tri-n-butylsilyl(meth)acrylate.

As tri-organosilyl(meth)acrylate expressed by the above general formula (4), tri-isopropylsilyl(meth)acrylate is preferred from the viewpoint of maintaining a stable polishing rate over an extended term. The above-mentioned tri-organosilyl(meth)acrylates may be used singly or in combination of two or more species.

A method of polymerizing the above-mentioned monomers is not particularly limited and includes, for example, a method in which a monomer component consisting of the above tri-organosilyl(meth)acrylate and the above other copolymerizable unsaturated monomers is mixed with an initiator such as an azo compound or peroxide to prepare a mixed solution and the mixed solution is added dropwise to a solvent such as xylene, n-butanol and the like and the resulting mixture is reacted under the heating condition.

A number average molecular weight of the above acrylic resin and/or polyester resin (II) is not particularly limited and it is preferably in the range from 2000 of a lower limit to 100000 of an upper limit, and more preferably in the range from 3000 of a lower limit to 40000 of an upper limit. When the number average molecular weight is less than 2000, a film forming property of a coated film may be deteriorated, and when it is more than 100000, not only it is impractical since the storage stability of a coating composition to be obtained is deteriorated, but also it is unfavorable in point of public health and economy since use of a large amount of a diluent solvent is required in coating process.

A tri-alkylsilyl group is preferably contained in an amount 10% by mass of a lower limit to 90% by mass of an upper limit in the solid matter of the above acrylic resin and/or polyester resin (II). When this content is less than 10% by mass, a self-polishing property may become insufficient, and when it is more than 90% by mass, since an elution rate of a coated film is too fast, a coated film cannot be maintained for a long term, and therefore both cases are not preferred. The content of a tri-alkylsilyl group more preferably has the lower limit of 30% by mass and the upper limit of 80% by mass.

Further, as a resin binder of the above coating composition, an acrylic resin and/or a polyester resin (III) having at least one group expressed by the above general formula (1) on the side chain and having at least one group expressed by the above general formula (2) on the side chain can also be used and acrylic resin is preferred.

The above-mentioned acrylic resin and/or polyester resin (III) is preferably obtained from a monomer component containing tri-organosilyl(meth)acrylate expressed by the above general formula (4). Thereby, it is possible to attain a coated film having a high antifouling property for a longer term.

The above-mentioned acrylic resin and/or polyester resin (III) is obtained by performing a method 3 comprising a step of polymerizing 3 to 50% by mass of a (A) polymerizable unsaturated organic acid, 90 to 5% by mass of tri-organosilyl (meth)acrylate expressed by the above general formula (4) and other copolymerizable unsaturated monomer as a first step and a step of reacting a (B) resin obtained by the above first step with a metal compound and a monobasic acid or reacting by ester exchange using metal ester of a monobasic acid as a second step, or a method 4 of copolymerizing 3 to 50% by mass of a (A) polymerizable unsaturated organic acid, 90 to 5% by mass of tri-organosilyl(meth)acrylate expressed by the above general formula (4), other copolymerizable unsaturated monomer and metal-containing polymerizable unsaturated monomer.

The above-mentioned first step of the method 3 is a step of polymerizing 3 to 50% by mass of a (A) polymerizable unsaturated organic acid, 90 to 596 by mass of tri-organosilyl (meth)acrylate expressed by the above general formula (4) and other copolymerizable unsaturated monomer, and this step car be carried out similarly using the components and the method described in the above description of the above acrylic resin and/or polyester resin (II).

A number average molecular weight of a resin obtained by the above first step of the method 3 is not particularly limited and it is preferably in the range from 2000 of a lower limit to 100000 of an upper limit, and more preferably in the range from 3000 of a lower limit to 40000 of an upper limit. When the number average molecular weight is less than 2000, a film forming property of a coated film may be deteriorated, and when it is more than 100000, not only it is impractical since the storage stability of a coating composition to be obtained is deteriorated, but also it is unfavorable in point of public health and economy since use of a large amount of a diluent solvent is required in coating process.

The resin obtained by the first step of the above method 3 preferably has an acid value of 30 to 300 mg KOH/g. When the acid value is less than 30 mu KOH/g, an amount of metal salt bonding to the side chain is small and an antifouling property may be low, and when it is more than 300 mgKOH/g, since an elution rate is too fast, a prolonged antifouling property is not expected.

A second step of the above method 3 is a step of reacting a resin obtained by the above first step with a metal compound and a monobasic acid or reacting by ester exchange using metal ester of a monobasic acid. That is, the acrylic resin obtained by this second step comes to have at least one side chain expressed by the above general formula (1).

In the second step of the above method 3, a method of reacting a resin obtained by the above first step with a metal compound and a monobasic acid or a method of reacting by ester exchange using metal ester of a monobasic acid can be performed by a publicly known method, but heating/stirring is desirably carried out below a decomposition temperature of the metal ester.

As the above-mentioned resin binder, a metal-containing resin having a crosslinking structure may be employed in place of the above-mentioned acrylic resin and/or polyester resin (I), (II) and (III).

Examples of the above-mentioned metal-containing resin having a crosslinking structure include a resin containing a divalent metal in a crosslinking chain. A method of producing the above-mentioned resin containing a divalent metal includes a method of reacting (adding) a carboxyl group-containing resin with (to) a compound of divalent metal to obtain a resin containing a divalent metal and a method of polymerizing a monomer mixture comprising a polymerizable monomer containing a divalent metal by common solution polymerization to obtain a resin containing a divalent metal.

Examples of the metal-containing resin having a crosslinking structure obtained by the above-mentioned reaction include, for example, a resin having a crosslinked chain expressed by the following general formula (5);

  (5), wherein M represents a divalent metal such as Mg, Zn, Ca and the like.

Examples of the above-mentioned polymerizable monomer containing a divalent metal include, for example, a metal-containing polymerizable monomer having two unsaturated groups expressed by the following general formula (6);

  (6), wherein M represents a divalent metal such as Mg, Zn, Ca and the like, or the following general formula (7);

  (7), wherein M represents a divalent metal such as Mg, Zn, Ca and the like. A method of the above-mentioned solution polymerization is not particularly limited and a publicly known method can be employed.

And, the metal-containing resin having the above-mentioned crosslinking structure may be one having at least one group expressed in the above general formula (1).

An amount of metal of the above-mentioned metal-containing resin having a crosslinking structure is preferably 0.05 to 20% by mass in terms of the total amount of metal in the crosslinking structure and metal in the group expressed by the above general formula (1) in the solid matter of a resin.

The coating composition of the present invention may assume any form of a solvent-borne coating composition, a NAD type coating composition and a water-borne coating composition. When the coating composition of the present invention is solvent-borne, the above acrylic resin and/or polyester resin can use directly a solution obtained by a reaction in a solvent. When it is a water-borne coating composition, for example, a method of dispersing an organic solvent solution of an acrylic resin and/or a polyester resin obtained by the above-mentioned method in water by a publicly known method can be used. A method of dispersing is not particularly limited and includes a method of emulsifying by an emulsifier and a method of dispersing by neutralizing a part of a carboxyl group in the above acrylic resin and/or polyester resin with a basic compound. And, a method of obtaining the above metal-containing resin having a crosslinking structure by emulsion polymerization may also be employed.

The above-mentioned basic compound is not particularly limited and examples of the basic compounds include, for example, alkyl amines such as ammonia (aqueous solution), triethylamine, trimethylamine, butylamine and the like; alcohol amines such as ethanolamine, 2-dimethylaminoethanol, triethanolamine, diethyl ethanolamine, dimethyl ethanolamine, aminomethylpropanol and the like; and morpholine as a preferred compound. Among others, ammonia and ethanolamine are preferred. These basic compounds may be used singly or in combination of two or more species.

The coating composition of the present invention may contain other resin binders in addition to the above acrylic resin and/or polyester resin (I), (II) or (III) in order to adjust the properties of the coated film or the attrition rate of the coated film in the case fusing as an antifouling coating composition. A mass ratio of the total of the resin solid matter of the above acrylic resin and/or polyester resin (I) and the resin solid matter of the above acrylic resin and/or polyester resin (II) to the resin solid matter of the above other resin binders [the acrylic resin and/or polyester resin (I) and the acrylic resin and/or polyester resin (II)]:[the other resin binders] is preferably 100:0 to 50:50.

When the proportion of the above other resin binders is out of the above range, since an excellent prolonged antifouling property and the excellent crack resistance of a coated film cannot be achieved simultaneously, it is not preferred. As the above other resin binders, the above-mentioned compounds can be used.

In the above coating composition, common additive such as an antifouling agent, a plasticizer, pigment and a solvent may be added to the above acrylic resin and/or polyester resin (I), (II) or (III).

The above-mentioned antifouling agent is not particularly limited and a publicly known antifouling agent can be used, and example of them include an inorganic compound, an organic compound containing metal and an organic compound not containing metal.

The above-mentioned antifouling agent is not particularly limited and includes, for example, zinc oxide, cuprous oxide, manganese ethylenebis(dithiocarbamate), zinc dimethylcarbamate, 2-methylthio-4-t-butylamino-6-cyclopropylamino-s-triazine, 2,4,6-tetrachloroisophthalonitrile, N,N-dimethyl-dichlorophenylurea, zinc ethylenebis(dithiocarbamate), copper rhodanate, 4,5-dichloro-2-n-octyl-3(2H)isothiazolone, N-(fluorodichloromethylthio)phthalimide, N,N'-dimethyl-N'-phenyl-(N-fluorodichloromethylthlo)sualfamide, metal salt such as zinc salt or copper salt of 2-pyridinethlol-1-oxide, tetramethylthiuram disulfide, 2,4,6-trichlorophenyl-maleimide, 2,3,5,6-tetrachloro-4-(methylsulfonyl)pyridine, 3-iode-2-propylbutylcarbamate, diodemethyl-p-tolylsulfone, phenyl(bispyridyl)bismuth dichloride, 2-(4-thiazolyl)benzimidazole, pyridine-triphenylborane, stearylamine-triphenylborane, and laurylamine-triphenylborane. These antifouling agents may be used singly or in combination of two or more species.

The usage of the above antifouling agent is preferably in the range from 0.1% by mass of a lower limit to 80% by mass of an upper limit in the solid matter of a coating composition. When the usage is less than 0.1% by mass, an effect of antifouling cannot be expected, and when it is more than 80% by mass, defects such as cracks and peeling may be produced in a coated film. The range of usage more preferably has the lower limit of 1% by mass and the upper limit of 60% by mass.

Examples of the above-mentioned plasticizer include plasticizers of phthalic acid ester such as dioctylphthalate, dimethylphthalate and dlcyclohexyl phthalate; plasticizers of aliphatic dibasic acid ester such as isobutyl adipate and dibutyl sebacate; plasticizers of glycol ester such as diethylene glycol dibenzoate and pentaerythritol alkyl ester; plasticizers of phosphoric ester such as trichlene diphosphate and trichloroethyl phosphate; plasticizers of epoxy such as epoxy soybean oil and octyl epoxystearate; plasticizers of organic tin such as dioctyltin dilaurate and dibutyltin laurate; and trioctyl trimelitate and triacetylene. These plasticizers may be used singly or in combination of two or more species.

Examples of the above-mentioned pigment include extenders such as precipitated barium, talc, clay, chalk, silica white, alumina white and bentonite; and coloring pigments such as titanium oxide, zircon oxide, basic lead sulfate, tin oxide, carbon black, graphite, red iron oxide, chrome yellow, copper phthalocyanine green, copper phthalocyanine blue and quinacridone. These pigments may be used singly or in combination of two or more species.

Examples of the above solvent include hydrocarbons such as toluene, xylene, ethylbenzene, cyclopentane, octane, heptane, cyclohexane and white spirit; ethers such as dioxane, tetrahydrofurant ethylene glycol monomethyl ether, ethylene glycol monoethyl ether, ethylene glycol monobutyl ether, ethylene glycol dibutyl ether, diethylene glycol monomethyl ether and diethylene glycol monoethyl ether; esters such as butyl acetate, propyl acetate, benzyl acetate, ethylene glycol monomethyl ether acetate and ethylene glycol monoethyl ether acetate; ketones such as ethyl isobutyl ketone and methyl isobutyl ketone; and alcohols such as n-butanol and propyl alcohol. These solvents may be used singly or in combination of two or more species.

Other additives other than the above additives are not particularly limited and include monobasic organic acids such as monobutyl phthalate and monooctyl succinate, camphor, castor oil; water binder, anti-sagging agent; anti-flooding agent; an antiprecipitation agent; and antifoamer.

The coating composition of the present invention can be prepared by adding the above organic polymer particle and the common additives, as required, such as an antifouling agent, a plasticizer, a compensating agent for coated film attrition, pigment and a solvent may be added to the above acrylic resin and/or polyester resin (I), (II) or (III) and mixing the mixture with a ball mill, a pebble mill, a roll mill, or a sand-grinding mill.

The coating composition can form a dried coated film by applying it onto the surface of a substance to be coated according to a normal method and vaporizing/removing a solvent at room temperature or under the condition of heating.

A coated film formed from the above coating composition also constitutes the present invention. Since the coated film of the present invention is formed from the above coating composition, it has excellent low friction performance. The above coated film can be formed by applying the above coating composition-by a publicly known method such as dipping, spraying, brushing, roller application, electrostatic coating and electrodeposition.

A method of reducing friction in water, comprising the step of forming such a coated film on the surface of a substance to be coated, also constitutes the present invention. The above substance to be coated may be pre-treated as required. The above substance to be coated is not particularly limited, but a marine vessel, a piping material and a fishing net are preferred because a coated film exhibiting excellent low friction performance is formed.

The coating composition of the present invention is superior to a conventional coating composition in that it can impart good low friction performance when it is applied to a marine vessel which moves at a speed of about 10 to 30 knot. By applying the above coating composition, it is possible to reduce frictional resistance by 2 to 3% or more compared with the application of the conventional antifouling coating composition. Thus, the coating composition of the present invention can contribute to the reduction in navigation fuel to be consumed significantly as a coating composition for vessel bottom.

EFFECT OF THE INVENTION

In accordance with the present invention, a coating composition which can attain excellent low friction performance without limiting a resin binder was attained. Since the resin binder is not limited, it is possible to attain low friction performance without impairing the functions of a conventional coating composition. Since a coated film formed from the above coating composition has excellent low friction performance, a method of reducing friction in water, comprising the step of forming the above coated film on the surface of a substance to be coated, could also be attained in accordance with the present invention.

BEST MODES FOR CARRYING OUT THE INVENTION

Hereinafter, the present invention will be described in more detail by way of examples, but the present invention is not limited to these examples.

PRODUCTION EXAMPLE 1

In a four necked flask equipped with a condenser, a thermometer, a stirrer and a nitrogen inlet tube, 80 g of xylene and 20 g of n-butanol were placed, and the mixture was heated to 100° C. To this solution, a mixed solution of 40 g of ethyl acrylate, 18 g of acrylic acid (0.25M), 15 g of cyclohexyl acrylate, 27 g of methoxypolyethyleneglycol methacrylate (n=9) and 1.5 g of t-butylperoxy-2-ethyl hexanoate was added dropwise over 3 hours and then the temperature of the mixture was maintained for 3 hours. This was assumed to be a resin solution A.

PRODUCTION EXAMPLE 2

In a four necked flask equipped with a condenser, a thermometer, a stirrer and a nitrogen inlet tube, 100 g of xylene was placed and heated to 100° C. To this solution, a mixed solution of 40 g of methyl methacrylate, 55 g of tri-isopropylsilyl methacrylate, 5 g of 2-methoxyethyl methacrylate and 1.5 g of t-butylperoxy-2-ethyl hexanoate was added dropwise over 3 hours and then the temperature of the mixture was maintained for 3 hours to obtain a resin solution B having a solid matter content of 50.7% by mass.

PRODUCTION EXAMPLE 3

In a four necked flask equipped with a condenser, a thermometer, a stirrer, a nitrogen inlet tube and a decanter, 20 g of isopropyl alcohol, 110 g of propylene glycol methyl ether and 22 g (0.25 M) of zinc oxide were placed, and the mixture was heated to 80° C. To this solution, 22 g of methacrylic acid (0.25M) and 75 g of naphthenic acid (Mw=300, acid value (AV)=165) were added dropwise over 2 hours and the temperature of the mixture was maintained for 2 hours. A solvent was removed from this solution at 75° C. under a reduced pressure to obtain a monomer solution C having a polymerizable monomer content of 50.4% by mass.

PRODUCTION EXAMPLE 4

In a four necked flask equipped with a condenser, a thermometer, a stirrer, a nitrogen inlet tube and a decanter, 200 g of the resin solution A obtained in Production Example 1, 80 g of rosin, 32 g of copper acetate and 200 g of xylene were placed, and a solvent was removed from the mixture under refluxing while adding xylene. Then, 40 g of n-butanol was added to obtain a resin solution D having a solid matter content of 51.3% by mass.

PRODUCTION EXAMPLE 5

In a four necked flask equipped with a condenser, a thermometer, a stirrer and a nitrogen inlet tube, 90 g of xylene was placed and heated to 100° C. To this solution, a mixed solution of 30 g of methyl methacrylate, 55 g of tri-isopropylsilyl methacrylate, 5 g of 2-methoxyethyl methacrylate, 20 g of the monomer solution C and 1.5 g of t-butylperoxy-2-ethyl hexanoate was added dropwise over 3 hours and then the temperature of the mixture was maintained for 3 hours to obtain a resin solution E having a solid matter content of 50.5% by mass.

PRODUCTION EXAMPLE 6

Preparation of Resin Solution F

In a four necked flask equipped with a condenser, a thermometer, a stirrer, a nitrogen inlet tube and a decanter, 200 g of the resin solution A, 82 g of hydrogenated rosin, 34 g of zinc acetate and 200 g of xylene were placed, and a solvent was removed from the mixture under refluxing while adding xylene. Then, 40 g of n-butanol was added to obtain a resin solution F having a solid matter content of 53.8% by mass.

PRODUCTION EXAMPLE 7

Preparation of Resin Solution G

In a four necked flask equipped with a condenser, a thermometer, a stirrer, a nitrogen inlet tube and a decanter, 200 g of the resin solution A, 50 g of hydrogenated rosin, 33 g of 12-hydroxystearic acid, 34 g of zinc acetate and 200 g of xylene were placed, and a solvent was removed from the mixture under refluxing while adding xylene. Then, 40 g of n-butanol was added to obtain a resin solution G having a solid matter content of 54.2% by mass.

PRODUCTION EXAMPLE 8

Preparation of Metal-containing Monomer Mixture M1

Into a four necked flask equipped with a condenser, a thermometer, a dropping funnel and a stirrer, 85.4 g of PGM (propylene glycol methyl ether) and 40.7 g of zinc oxide were charged, and the mixture was heated to 75° C. while stirring the mixture. Subsequently, a mixture of 43.1 g of methacrylic acid (MAA), 36.1 g of acrylic acid (AA) and 5 g of water was added dropwise from a dropping funnel with constant velocity over 3 hours. After adding dropwise, a reaction solution changed in a color from milky to clear. After stirring for another 2 hours, 36 g of PGM was added to obtain a clear metal-containing monomer mixture M1. The content of a polymerizable monomer containing divalent metal was 44.8%.

PRODUCTION EXAMPLE 9

Preparation of Metal-containing Monomer Mixture M2

Into a four necked flask equipped with a condenser, a thermometer, a dropping funnel and a stirrer, 72.4 g of PGM (propylene glycol methyl ether) and 40.7 g of zinc oxide were charged, and the mixture was heated to 75° C. while stirring the mixture. Subsequently, a mixture of 30.1 g of methacrylic acid, 25.2 g of acrylic acid and 51.6 g of versatic acid was added dropwise from a dropping funnel with constant velocity over 3 hours. After adding dropwise, a reaction solution changed in a color from milky to clear. After stirring for another 2 hours, 11 g of PGM was added to obtain a clear metal-containing monomer mixture M2. The content of a polymerizable monomer containing divalent metal was 59.6%.

PRODUCTION EXAMPLE 10

Preparation of Water-borne Resin H

In a four necked flask equipped with a condenser, a thermometer, a dropping funnel and a stirrer, 70 g of propylene glycol methyl ether was placed and heated to 110° C. To this solution, 15 g of methyl methacrylate, 35 g of ethyl acrylate, 55 g of tri-isopropylsilyl acrylate, 15 g of the monomer mixture M1 obtained in Production Example 8, 50 g of the monomer mixture M2 obtained in Production Example 9 and 1.2 g of azobis(methylbutylonitrile) were added dropwise over 4 hours and then the mixture was maintained at 110° C. for 2 hours. Next, a solvent was removed from the mixture under a reduced pressure, and to this, 8 g of dimethyl methanolamine and 40 g of ion-exchange water were added at room temperature to adjust a solid matter content to 50%. This resin solution had the solid matter content of 50.6%.

PRODUCTION EXAMPLE 11

Preparation of Water-borne Resin I

In a four necked flask equipped with a condenser, a thermometer, a dropping funnel and a stirrer, 70 g of propylene glycol methyl ether was placed and heated to 110° C. To this solution, 15 g of methyl methacrylate, 35 g of ethyl acrylate, 15 g of acrylic acid, 55 g of tri-isopropylsilyl acrylate, 5 g of methoxyethyl acrylate and 1.2 g of azobis(methylbutylonitrile) were added dropwise over 4 hours and then the mixture was maintained at 110° C. for 2 hours. Next, a solvent was removed from the solution under a reduced pressure, and to this, 8 g of dimethyl methanolamine and 40 g of ion-exchange water were added at room temperature to adjust a solid matter content to 50%. This resin solution had the solid matter content of 48.8%.

PRODUCTION EXAMPLE 12

In a four necked flask equipped with a condenser, a thermometer, a stirrer and a nitrogen inlet tube, 500 g of heptane was placed and heated to 80° C. To this solution, 30 g of methyl methacrylate, 20 g of methoxypolyethyleneglycol methacrylate (n=9), 10 g of ethylene glycol dimethacrylate, 20 g of 2-hydroxyethyl acrylate and 5 g of VPE-0201 (produced by Wako Pure Chemical Industries, Ltd.) were added, and the mixture was reacted for 7 hours to obtain a dispersion J of an organic polymer particle having a solid matter content of 18% by mass. This dispersion was centrifuged to obtain organic polymer particles J. A mass average particle diameter of this particle was 2.2 µm as a result of measuring with a laser light scattering particle diameter distribution measuring apparatus.

PRODUCTION EXAMPLE 13

In a four necked flask equipped with a condenser, a thermometer, a stirrer and a nitrogen inlet tube, 500 g of heptane was placed and heated to 80° C. To this solution, 30 g of methyl methacrylate, 20 g of methoxypolyethyleneglycol methacrylate (n=9), 25 g of N,N-dimethylaminoethyl acrylate, 10 g of ethylene glycol dimethacrylate and 7 g of VPE-0601 (produced by Wako Pure Chemical Industries, Ltd.) were added, and the mixture was reacted for 7 hours to obtain a dispersion K of an organic polymer particle having a solid matter content of 18% by mass. This dispersion was centrifuged to obtain organic polymer particles K having a mass average particle diameter of 1.8 µm.

PRODUCTION EXAMPLE 14

In a four necked flask equipped with a condenser, a thermometer, a stirrer and a nitrogen inlet tube, 500 g of heptane was placed and heated to 80° C. To this solution, 20 g of methyl methacrylate, 20 g of nonylphenol ethylene oxide acrylate (average polymerization degree: 8), 30 g of ethylene glycol dimethacrylate and 7 g of V-59 (produced by Wako Pure Chemical Industries, Ltd.) were added, and the mixture was reacted for 7 hours to obtain a dispersion L of an organic polymer particle having a solid matter content of 13% by mass. This dispersion was centrifuged to obtain organic polymer particles L having a mass average particle diameter of 0.8 µm.

PRODUCTION EXAMPLE 15

γ-polyglutamic acid was milled with a jet mill to obtain organic polymer particles M having a mass average particle diameter of 4 µm.

PRODUCTION EXAMPLE 16

In a four necked flask equipped with a condenser, a thermometer, a stirrer and a nitrogen inlet tube, 500 g of heptane was placed and heated to 80° C. To this solution, 20 g of methyl methacrylate, 15 g of 4-vinylpyridine, 20 g of ethylene glycol dimethacrylate and 7 g of V-59 (produced by Wako Pure Chemical Industries, Ltd.) were added, and the mixture was reacted for 7 hours to obtain a dispersion N of an organic polymer particle having a solid matter content of 10% by mass. This dispersion was centrifuged to obtain organic polymer particles N having a mass average particle diameter of 1.1 µm.

PRODUCTION EXAMPLE 17

10 g of a 5% aqueous solution of chitosan-acetate salt and 10 g of a 5% aqueous solution of alginic acid were added dropwise to 200 g of deionized water over 2 hours while stirring with a homogenizer to obtain organic polymer particles O having a mass average particle diameter of 7 µm.

PRODUCTION EXAMPLE 18

Organic polymer particles P, Q, R and S, each of which has a mass average particle diameter of 2 to 8 µm and consists of polyvinyl alcohol (produced by KURARAY CO., LTD.: PVA-124), polyethylene oxide (produced by SUMITOMO SEIKA CHEMICALS CO., LTD.: PEO-1Z), chitin (produced by Dainichiseika Color & Chemicals Mfg. Co., Ltd.: chitin P), and chitosan (produced by KoyoChemical Co., Ltd.: SK-10), were obtained by the same method as in Production Example 15.

PRODUCTION EXAMPLE 19

Production of Composite Resin Particle

An aqueous solution of chitosan was obtained by mixing 7.0 g of chitosan ("DAICHITOSAN VL", NV 100%, produced by Dainichiseika Color & Chemicals Mfg. Co., Ltd.), 57.7 g of eon-exchange water and 5.3 g or acrylic acid with a mixer. To an aqueous solution consisting of 70.0 g of this aqueous solution of chitosan, 30.0 g of ER-20 (nonionic reactive emulsifier produced by Asahi Denka Co., Ltd.) and 162.6 g of ion-exchange water was added a mixed solution of 28.8 g of methyl methacrylate, 10.1 g of cyclohexyl methacrylate, 40.6 g of 2-ethylhexyl acrylate, 10.0 g of ethylene glycol dimethacrylate and 4.0 g of PEROYL L (peroxide radical initiator produced by NOF CORPORATION). Then, the resulting mixture was emulsified using a mixer to obtain a suspension (a diameter of suspended particle is 10 µm).

Into a reactor equipped with a dropping funnel, a thermometer, a nitrogen inlet tube, a reflux condenser and a stirrer, 0.2 g of hydroquinone, 9.0 g of ER-20 (nonionic reactive emulsifier produced by Asahi Denka Co., Ltd.), 70.0 g of the above aqueous solution of chitosan and 262.2 g of ion-exchange water were charged, and the mixture was heated to 70° C. in an atmosphere of nitrogen. Next, to this, 356.1 g of the resulting suspension was added at once and a reaction of the mixture was continued at the same temperature for 4 hours, and then it was concluded that the polymerization reaction was completed and a reactor was cooled to obtain composite resin particles 1. A chitosan-acryl composite resin particle thus obtained had a solid matter content of 20% by mass and an average particle diameter of 15 μm. Only chitosan-acryl composite resin particle could be obtained through centrifuging. The obtained composite resin particle 1 was placed in xylene but xylene becomes clouded and the composite resin particle 1 did not dissolved in xylene. It becomes evident from this result that the above composite resin particle 1 can be used without changing the properties of a coating composition even if it is used for a solvent-borne coating composition.

PRODUCTION EXAMPLES 20 TO 26

Production of Composite Resin Particles 2 to 8

Composite resin particles 2 to 8 were obtained by following the same procedure as in Production Example 19 except for changing to the formulations of Tables 1 and 2. Further, the obtained composite resin particles 2 to 8 were placed in xylene but xylene becomes clouded and all of the composite resin particles did not dissolved in xylene.

In addition, all units in Tables are "grams". And, commercially available products used in Table 2 are as follows.
polyethylene oxide: "PEO-1", NV 100%, produced by SUMITOMO SEIKA CHEMICALS CO., LTD.
carbonyl-containing water-soluble resin: "D-700", NV 100%, produced by UNITIKA Ltd.
polyacrylamide (anionic) : "Polystron 619", NV 7.1%, produced by Arakawa Chemical Industries, Ltd.
polyallylamine: "PAA-10C", NV10%, produced by Nitto Boseki Co., Ltd.
hydroxyethyl cellulose: "CELLOSIZE OP 09L", produced by Dow Chemical Co.

TABLE 1

| | Sample name | | Production Example 20 | Production Example 21 |
|---|---|---|---|---|
| Pre-charged | | Hydroquinone | 0.2 | 0.2 |
| | | Emulsifier (ER-20) | — | — |
| | | Chitosan | — | — |
| | | Acrylic acid | — | — |
| | | PVA | 3.0 | 3.0 |
| | | Ion-exchanged water | 37.0 | 37.0 |
| | | Ion-exchanged water | 265.0 | 265.0 |
| Suspension | Emulsifier aqueous others | Emulsifier (ER-20) | — | — |
| | | Chitosan | — | — |
| | | Acrylic acid | — | — |
| | | PVA | 2.0 | 2.0 |
| | | Ion-exchanged water | 24.7 | 24.7 |
| | | Ion-exchanged water | 90.0 | 90.0 |
| | Monomer/ Initiator | MMA | 42.1 | 37.4 |
| | | NBMA | 21.5 | 19.1 |
| | | EHA | 26.4 | 23.5 |
| | | DMAEMA | — | 10.0 |
| | | EGDM | 10.0 | 10.0 |
| | | Initiator | 4.0 | 4.0 |
| NV | | | 20% | 20% |
| Particle diameter (μm) | | | 20 | 22 |
| Solubility in xylene | | | clouded | clouded |

TABLE 2

| | Sample name | Production Example 22 | Production Example 23 | Production Example 24 | Production Example 25 | Production Example 26 |
|---|---|---|---|---|---|---|
| Pre-charged | Hydroquinone | 0.2 | 0.2 | 0.2 | 0.2 | 0.2 |
| | Emulsifier (ER-20) | 9.0 | 9.0 | 9.0 | 9.0 | 9.0 |
| | PEO | 7.0 | — | — | — | — |
| | Carbonyl-containing water-soluble resin | — | 7.0 | — | — | — |
| | Polyacrylamide | — | — | 98.6 | — | — |
| | Polyacrylamine | — | — | — | 70.0 | — |
| | Hydroxyethyl cellulose | — | — | — | — | 7.0 |
| | Ion-exchangedwater | 57.7 | 57.7 | — | — | 57.7 |
| | Ion-exchangedwater | 262.0 | 262.0 | 228.1 | 256.7 | 262.0 |
| Suspension | Emulsifer aqueous others | Emulsifier (ER-20) | 30.0 | 30.0 | 30.0 | 30.0 | 30.0 |
| | PEO | 7.0 | — | — | — | — |
| | Carbonyl-containing water-soluble resin | — | 7.0 | — | — | — |
| | Polyacrylamide | — | — | 98.6 | — | — |
| | Polyacrylamine | — | — | — | 70.0 | — |
| | Hydroxyethyl cellulose | — | — | — | — | 7.0 |
| | Ion-exchangedwater | 57.7 | 57.7 | — | — | 57.7 |
| | Ion-exchangedwater | 162.6 | 162.6 | 128.7 | 157.3 | 162.6 |
| Monomer/ Initiater | MMA | 42.1 | 42.1 | 42.1 | 42.1 | 42.1 |
| | NBMA | 21.5 | 21.5 | 21.5 | 21.5 | 21.5 |
| | EHA | 26.4 | 26.4 | 28.4 | 26.4 | 26.4 |
| | DMAEMA | — | — | — | — | — |
| | EGDM | 10.0 | 10.0 | 10.0 | 10.0 | 10.0 |
| | Initiator | 4.0 | 4.0 | 4.0 | 4.0 | 4.0 |

TABLE 2-continued

| Sample name | Production Example 22 | Production Example 23 | Production Example 24 | Production Example 25 | Production Example 26 |
|---|---|---|---|---|---|
| NV | 20% | 20% | 20% | 20% | 20% |
| Particle diameter (μm) | 40 | 36 | 28 | 15 | 32 |
| Solubility in xylene | clouded | clouded | clouded | clouded | clouded |

On the obtained organic polymer particles J to S and composite resin particles 1 to 8 and the commercially available organic polymer particles T to V, the solubility of the particle in the artificial seawater and the water-absorbing amount of the particle for the artificial seawater were measured according to the following methods.

(Solubility and Water-absorbing Amount)

One g of organic polymer particles dried at room temperature in a vacuum (under a reduced pressure) were precisely weighed out, and the particles were put in 50 g of artificial seawater prepared according to ASTM D1141-98 and stirred at 23° C. for 5 hours. Then, the particles were filtered, a residue was washed with water, and the particles were weighed to determine the water-absorbing amount.

Next, after drying the organic polymer particles at room temperature under a reduced pressure, the dried particles were weighed to determine the solubility in seawater. The results are shown in Table 3.

TABLE 3

| | | Solubility g/L | Water-absorbing amount % by mass |
|---|---|---|---|
| Organic high polymer particle J | | <2 | 0.3 |
| Organic high polymer particle K | | <2 | 0.5 |
| Organic high polymer particle L | | <2 | 0.9 |
| Organic high polymer particle M | | <2 | 0.5 |
| Organic high polymer particle N | | <2 | 0.3 |
| Organic high polymer particle O | | <2 | 0.6 |
| Organic high polymer particle P | PVA | >20 | |
| Organic high polymer particle Q | PEO | >20 | |
| Organic high polymer particle R | chitin | <2 | 6 |
| Organic high polymer particle S | chitosan | <2 | 8 |
| Organic high polymer particle T *1) | chitosan | <2 | 12 |
| Organic high polymer particle U *2) | acryl | <2 | 0.2 |
| Organic high polymer particle V *3) | silk | <2 | 0.6 |
| Composite resin particle 1 | | <2 | 1.3 |
| Composite resin particle 2 | | <2 | 4.2 |
| Composite resin particle 3 | | <2 | 5.5 |
| Composite resin particle 4 | | <2 | 3.1 |
| Composite resin particle 5 | | <2 | 2.5 |
| Composite resin particle 6 | | <2 | 3.3 |
| Composite resin particle 7 | | <2 | 1.6 |
| Composite resin particle 8 | | <2 | 3.6 |

*1) 6% slurry of chitosan (produced by Dainichiseika Color & Chemicals Mfg, Co., Ltd.: 2 μm)
*2) acryl particle produced by Sekisui Chemical Co., Ltd.: 8 μm
*3) silk fine powder (mass average particle diameter: <6 μm)

EXAMPLES 1 TO 25 AND COMPARATIVE EXAMPLES 1 TO 7

Based on the compositions shown in Tables 5, 6, 7, each mixed components was dispersed with glass beads using a disper to prepare a coating composition. All of units are "grams". The following evaluations were carried out on the obtained coating composition.

Further, the antifouling agents used are as shown in Table 4.

(Frictional Resistance Test)

The obtained coating composition was applied to a vinyl chloride cylindrical drum of 10 cm in diameter and 10 cm in height, and this drum was rotated (equivalent to the speeds of about 15 knots and about 25 knots) in seawater and frictional resistance was measured with a torque meter. The respective frictional resistance was measured using the frictional resistance of a smooth vinyl chloride cylindrical drum mirror-finished by buffing as a reference. The respective increases and decreases in frictional resistance are shown in Tables 8 and 9. The frictional resistance immediately after immersion in seawater and after immersing for 1 month in seawater was measured.

(Antifouling Property)

The coating compositions obtained in Examples 1 to 25 and Comparative Examples 1 to 7 were applied onto a blasted plate (300 mm×10 mm×1.6 mm), to which a rust preventive coating composition was applied, in such a way that a dried film thickness is about 300 μm and left standing for two days in a room to be dried. The surface condition of this test plate was visually observed and evaluated. Further, this test plate was subjected to a seawater immersion using a raft to visually evaluate a percentage of an area to which marine life adheres. The results of evaluations are shown in Tables 8 and 9. Number of the months in Table indicates the number of the months after immersion using a raft.

TABLE 4

| Antifouling agent 1 | zinc dimethyl dithiocarbamate |
|---|---|
| Antifouling agent 2 | manganese ethylene bis(dithiocarbamate) |
| Antifouling agent 3 | 2-methylthio-4-t-butylamino-6-cyclopropylamino-s-triazine |
| Antifouling agent 4 | 2,4,5,6-tetrachloroisophthalonitrile |
| Antifouling agent 5 | N,N-dimethyldichlorophenylurea |
| Antifouling agent 6 | 4,5-dichloro-2-n-octyl-3(2H)isothiazolone |
| Antifouling agent 7 | N-(fluorodichloromethylthio)phthalimide |
| Antifouling agent 8 | N,N'-dimethyl-N'-phenyl-(N-fluorodichloromethylthio)sulfamide |
| Antifouling agent 9 | 2,4,6-trichlorophenylmaleimide |
| Antifouling agent 10 | 2,3,5,6-tetrachloro-4-(methyl sulfonyl)pyridine |
| Antifouling agent 11 | 3-iode-2-propenylbutylcarbamate |
| Antifouling agent 12 | diodemethyl-p-tolylsulfone |
| Antifouling agent 13 | bisdimethyldithiocarbamoyl-zinc ethylene bis(dithiocarbamate) |
| Antifouling agent 14 | phenyl(bispyridyl)bismuth dichloride |
| Antifouling agent 15 | 2-(4-thiazoyl)benzimidazole |
| Antifouling agent 16 | pyridine-triphenylborane |

TABLE 5

| No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Resin solution (species:amount) | B:50 | B:45 | D:45 | D:45 | E:45 | F:50 | E:50 | E:45 | | G:40 | F:35 | F:45 | G:45 | D:10 E:35 |
| Rubber chloride | | | | | | | | | 25 | | | | | |
| Cuprous oxide | 20 | 20 | 25 | 10 | | | | | | 25 | | 20 | 25 | 25 |
| Copper rhodanate | | | | 20 | 10 | 25 | | 15 | | 15 | | | 15 | |
| Zinc oxide | 5 | | 5 | | 5 | | 5 | | 5 | 5 | | 5 | 10 | 5 |
| Titanium oxide | 5 | | | | 5 | 3 | 5 | 5 | | 5 | | 3 | 2 | |
| Copper phthalocyanine blue | | | | | 5 | 3 | 3 | 5 | | 5 | | | 5 | |
| Talc | | 2 | 2 | | 4 | | | | | | 5 | 2 | | 3 |
| Red iron oxide | 2 | 4 | 3 | 3 | | | | | 5 | | 5 | 5 | | 3 |
| Organic high polymer particle | J:2 | K:1 | L:2 | M:1 | N:2 | O:0.5 | R:2 | S:2 | | O:2 R:4 | | L:2 | K:2 | M:2 |
| Organic high polymer particle T | | | | 4 | | | | | 5 | | | | | |
| Organic high polymer particle U | | | | | | | | | | | 1 | | | |
| Organic high polymer particle V | | | | | | | | | | 2 | | | | |
| Zinc pyrithione | 3 | | | | 4 | 2.5 | 4 | 3 | | | | | | |
| Copper pyrithione | | 2 | 3 | | | | | | | 5 | 6 | | 2 | 3 |
| Tetramethylthiuram disulfide | | | | | 3 | 2 | | | | | | | | |
| Antifouling agent | a:2 | b:2 f:2 j:2 p:1 | e:3 h:2 o:3 | c:3 d:2 | p:5 | p:3 | a:4 g:4 k:3 p:4 | i:4 p:5 | f:5 | m:3 o:2 | f:3 l:3 | n:2 | f:5 p:2 | o:2 |
| Polyvinyl ethyl ether | | 2 | 3 | 3 | | | | 5 | 4 | 4 | 3 | | 5 | 5 |
| Chlorinated paraffin | 2 | | | | 4 | | 3 | | 2 | 3 | 2 | | | |
| Dibutylphthalate | 1 | 2 | | | | | 2 | | | | | | | |
| Rosin | | 5 | | | | 5 | 4 | | | | | | | |
| Rosin ester | | | | | 3 | | | | | | | | | 2 |
| Colloidal silica | 2 | 2 | 2 | 3 | 2 | 2 | 3 | 4 | 2 | 3 | 3 | 2 | 2 | 2 |
| n-butanol | 2 | 3 | 2 | 3 | 3 | 2 | 2 | 3 | 2 | 3 | 3 | 3 | 3 | 2 |
| Xylene | 4 | 2 | | | | | 2 | 6 | | 20 | 5 | 5 | 3 | 2 |
| Methyl isobutyl ketone | | 3 | | 3 | | | | | | | | | 3 | |
| Total | 100 | 100 | 100 | 100 | 100 | 100 | 100 | 100 | 100 | 100 | 100 | 100 | 100 | 100 |
| NV | 69 | 69.5 | 75.5 | 71.5 | 74.5 | 71 | 67 | 74.5 | 78 | 72 | 74.5 | 68.5 | 72.5 | 75.5 |
| Resin solid matter | 25 | 22.5 | 22.5 | 22.5 | 22.5 | 25 | 25 | 22.5 | 25 | 20 | 17.5 | 22.5 | 22.5 | 22.5 |
| Solid matter of pigment and particle | 44 | 47 | 53 | 49 | 52 | 46 | 42 | 52 | 53 | 52 | 57 | 46 | 50 | 53 |
| Particle/Solid matter % | 4.5 | 2.1 | 3.8 | 10.2 | 3.8 | 1.1 | 4.8 | 3.8 | 9.4 | 3.8 | 12.3 | 4.3 | 4.0 | 3.8 |

TABLE 6

| NO. | 1 | 2 | 3 | 4 | 5 | 6 | 7 |
|---|---|---|---|---|---|---|---|
| Resin solution | B:50 | E:50 | | E:50 | B:50 | B:50 | B:50 |
| Rubber chloride | | | 25 | | | | |
| Cuprous oxide | 20 | | 25 | | 20 | 20 | 15 |
| Copper rhodanate | | | | | | | |
| Zinc oxide | 5 | 5 | 5 | 5 | 5 | 5 | 4 |
| Titanium oxide | 5 | 5 | | 5 | 5 | 5 | 3 |
| Copper phthalocyanine blue | | 3 | | 3 | | | |
| Red iron oxide | 2 | | 5 | | 2 | 2 | 2 |
| Organic high polymer particle | | | | Q:2 | P:2 | J:0.05 | J:10 |
| Zinc pyrithione | 3 | 4 | | 4 | 3 | 3 | 3 |
| Copper pyrithione | | | | | | | |
| Tetramethylthiuram disulfide | | | | | | | |
| Antifouling agent | a:2 | a:4 g:4 k:3 p:4 | f:5 | a:4 g:4 k:3 p:4 | a:2 | a:2 | a:2 |
| Polyvinyl ethyl ether | | | 4 | | | | |
| Chlorinated paraffin | 2 | 3 | 2 | 3 | 2 | 2 | 2 |
| Dibutylphthalate | 1 | 2 | | 2 | 1 | 1 | 1 |
| Rosin | | | | | | | |
| Rosin ester | | | | | | | |
| Colloidal silica | 2 | 3 | 2 | 3 | 2 | 2 | 2 |
| n-butanol | 2 | 2 | 2 | 2 | 2 | 2 | 2 |
| Xylene | 6 | 8 | 25 | 6 | 4 | 5.95 | 4 |
| Methyl isobutyl ketone | | | | | | | |
| Total | 100 | 100 | 100 | 100 | 100 | 100 | 100 |
| NV | 67 | 65 | 73 | 67 | 69 | 67.05 | 69 |
| Resin solid matter | 25 | 25 | 25 | 25 | 25 | 25 | 25 |

TABLE 6-continued

|  | Comparative Examples | | | | | | |
|---|---|---|---|---|---|---|---|
| NO. | 1 | 2 | 3 | 4 | 5 | 6 | 7 |
| Solid matter of pigment and particle | 42 | 40 | 48 | 42 | 44 | 42.05 | 44 |
| Particle/Solid matter % | 0.0 | 0.0 | 0.0 | 4.8 | 4.5 | 0.1 | 22.7 |

TABLE 7

|  | Examples | | | | | | | | | | |
|---|---|---|---|---|---|---|---|---|---|---|---|
|  | 15 | 16 | 17 | 18 | 19 | 20 | 21 | 22 | 23 | 24 | 25 |
| Resin solution (species:amount) | H:45 | I:30 | A:50 | B:45 | C:30 | D:50 | E:55 | A:45 | B:35 | F:55 | G:45 |
| Cuprous oxide | 40 | 35 |  |  | 35 | 25 |  |  | 35 |  | 25 |
| Zinc oxide |  | 7 | 25 | 30 | 10 | 5 | 25 | 30 |  | 25 |  |
| Copper phthalocyanine blue |  |  | 5 | 3 |  |  | 4 | 5 |  | 3 |  |
| Titanium oxide | 2 | 3 |  | 2 |  |  | 2 | 3 |  |  | 5 |
| Red iron oxide | 1 | 1 |  |  | 2 | 2 |  |  | 3 |  | 2 |
| Organic high polymer particle (species:amount) | R:2 | composite 2:2 | composite 2:3 | composite 3:2 | composite 4:1 | composite 5:2 | composite 6:2 | composite 7:1 | composite 8:3 | composite 1:2 | composite 6:1 |
| Zinc pyrithione | 3 | 2 | 3 | 2 |  | 2 |  | 3 |  | 3 | 2 |
| Copper pyrithione |  |  |  |  | 3 |  |  |  | 3 |  |  |
| Pyridine-triphenylborane |  |  | 3 | 3 |  |  |  | 2 |  | 3 |  |
| Chlorinated paraffin |  |  | 2 | 3 | 4 | 2 | 2 | 3 | 3 |  | 3 |
| Colloidal silica |  |  | 2 | 2 | 2 | 2 | 2 | 2 | 2 | 2 | 2 |
| DISPARLON 4500 *1 | 1 | 1 |  |  |  |  |  |  |  |  |  |
| Deionized water | 4 | 16 |  |  |  |  |  |  |  |  |  |
| Xylene |  |  | 5 | 5 | 10 | 8 | 6 | 4 | 13 | 4 | 13 |
| Methyl isobutyl ketone |  |  | 2 | 3 | 3 | 2 | 2 | 2 | 3 | 3 | 2 |
| Butyl cellosolve | 2 | 3 |  |  |  |  |  |  |  |  |  |
| Total | 100 | 100 | 100 | 100 | 100 | 100 | 100 | 100 | 100 | 100 | 100 |

*1) produced by Kusumoto Chemicals, Ltd.

TABLE 8

|  |  |  |  | Examples | | | | | | |
|---|---|---|---|---|---|---|---|---|---|---|
|  |  |  |  | 1 | 2 | 3 | 4 | 5 | 6 | 7 |
| Antifouling property test |  | 6 months |  | 0 | 0 | 0 | 0 | 0 | 0 | 0 |
|  |  | 12 months |  | 0 | 0 | 0 | 0 | 0 | 0 | 0 |
|  |  | 18 months |  | 0 | 0 | 0 | 0 | 0 | 0 | 0 |
|  |  | 22 months |  | 0 | 0 | 0 | 0 | 0 | 0 | 0 |
|  |  | 24 months |  | 0 | 0 | 0 | 0 | 0 | 0 | 0 |
| Coat Condition |  |  |  | normal | normal | normal | normal | normal | normal | normal |

|  |  | Re | Equivalent speed |  |  |  |  |  |  |  |
|---|---|---|---|---|---|---|---|---|---|---|
| Frictional resistance test | Beginning of test | 2500000 | about 15 knots | 2.0% | 0.8% | 0.2% | 0.5% | −0.2% | −0.8% | −1.1% |
|  |  | 4000000 | about 25 knots | 2.3% | 1.2% | 0.4% | 0.6% | −0.1% | −0.6% | −0.3% |
|  | After immersion in | 2500000 | about 15 knots | 1.4% | 0.2% | −0.2% | 0.1% | −0.4% | −2.1% | −2.2% |
|  |  | 4000000 | about 25 knots | 1.6% | 0.4% | 0.0% | 0.2% | −0.2% | −1.3% | −0.9% |

|  |  |  |  | Examples | | | | | | |
|---|---|---|---|---|---|---|---|---|---|---|
|  |  |  |  | 8 | 9 | 10 | 11 | 12 | 13 | 14 |
| Antifouling property test |  | 6 months |  | 0 | 0 | 0 | 0 | 0 | 0 | 0 |
|  |  | 12 months |  | 0 | 0 | 0 | 0 | 0 | 0 | 0 |
|  |  | 18 months |  | 0 | 0 | 0 | 0 | 0 | 0 | 0 |
|  |  | 22 months |  | 0 | 5 | 0 | 0 | 0 | 0 | 0 |
|  |  | 24 months |  | 0 | 25 | 0 | 0 | 0 | 0 | 0 |
| Coat Condition |  |  |  | normal | normal | normal | normal | normal | normal | normal |

TABLE 8-continued

|  |  | Re | Equivalent speed |  |  |  |  |  |  |  |
|---|---|---|---|---|---|---|---|---|---|---|
| Frictional resistance test | Beginning of test | 2500000 | about 15 knots | −0.8% | 3.2% | −0.2% | 0.6% | 0.6% | 0.3% | 0.1% |
|  |  | 4000000 | about 25 knots | −0.5% | 3.5% | 0.0% | 1.2% | 0.8% | 0.5% | 0.2% |
|  | After immersion in | 2500000 | about 15 knots | −1.9% | 2.1% | −0.9% | 0.1% | −0.8% | −1.2% | −0.5% |
|  |  | 4000000 | about 25 knots | −1.3% | 2.4% | −0.5% | 0.4% | −0.5% | −0.6% | −0.2% |

|  |  |  |  | Comparative Example |  |  |  |  |  |  |
|---|---|---|---|---|---|---|---|---|---|---|
|  |  |  |  | 1 | 2 | 3 | 4 | 5 | 6 | 7 |
| Antifouling property test | 6 months |  |  | 0 | 0 | 0 | 0 | 0 | 0 | 0 |
|  | 12 months |  |  | 0 | 0 | 0 | 0 | 0 | 0 | 0 |
|  | 18 months |  |  | 0 | 0 | 0 | 0 | 0 | 0 | 0 |
|  | 22 months |  |  | 0 | 0 | 10 | 0 | 0 | 0 | 0 |
|  | 24 months |  |  | 0 | 0 | 30 | 0 | 0 | 0 | 10 |
| Coat Condition |  |  |  | normal | normal | normal | normal | normal | normal | blister |

|  |  | Re | Equivalent speed |  |  |  |  |  |  |  |
|---|---|---|---|---|---|---|---|---|---|---|
| Frictional resistance test | Beginning of test | 2500000 | about 15 knots | 4.6% | 4.1% | 4.0% | 3.8% | 4.5% | 4.6% | 4.8% |
|  |  | 4000000 | about 25 knots | 4.8% | 4.4% | 4.3% | 4.1% | 4.7% | 4.9% | 4.9% |
|  | After immersion in | 2500000 | about 15 knots | 4.2% | 3.9% | 4.2% | 4.9% | 5.2% | 4.3% | 6.7% |
|  |  | 4000000 | about 25 knots | 4.5% | 4.2% | 4.5% | 5.2% | 5.8% | 4.8% | 7.8% |

TABLE 9

|  |  |  |  | Examples |  |  |  |  |  |  |
|---|---|---|---|---|---|---|---|---|---|---|
|  |  |  |  | 15 | 16 | 17 | 18 | 19 | 20 | 21 |
| Antifouling property test | 6 months |  |  | 0 | 0 | 0 | 0 | 0 | 0 | 0 |
|  | 12 months |  |  | 0 | 0 | 0 | 0 | 0 | 0 | 0 |
|  | 18 months |  |  | 0 | 0 | 0 | 0 | 0 | 0 | 0 |
|  | 22 months |  |  | 0 | 0 | 0 | 0 | 0 | 0 | 0 |
|  | 24 months |  |  | 0 | 0 | 0 | 0 | 0 | 0 | 0 |
| Coat Condition |  |  |  | normal | normal | normal | normal | normal | normal | normal |

|  |  | Re | Equivalent speed |  |  |  |  |  |  |  |
|---|---|---|---|---|---|---|---|---|---|---|
| Frictional resistance test | Beginning of test | 2500000 | about 15 knots | 2.2% | 2.8% | 3.8% | 3.5% | 2.5% | 2% | 1.2% |
|  |  | 4000000 | about 25 knots | 1.8% | 2.9% | 2.5% | 3.2% | 2.3% | 2.2% | 0.9% |
|  | After immersion in seawater for 1 month | 2500000 | about 15 knots | 0.3% | 0.1% | 1.1% | 0.2% | 0.2% | 1.1% | −0.3% |
|  |  | 4000000 | about 25 knots | 0% | 0.4% | 0.2% | −0.1% | −0.3% | 0.3% | −0.2% |

|  |  |  |  | 22 | 23 | 24 | 25 |
|---|---|---|---|---|---|---|---|
| Antifouling property test | 6 months |  |  | 0 | 0 | 0 | 0 |
|  | 12 months |  |  | 0 | 0 | 0 | 0 |
|  | 18 months |  |  | 0 | 0 | 0 | 0 |
|  | 22 months |  |  | 0 | 0 | 0 | 0 |
|  | 24 months |  |  | 0 | 0 | 0 | 0 |
| Coat Condition |  |  |  | normal | normal | normal | normal |

|  |  | Re | Equivalent speed |  |  |  |  |
|---|---|---|---|---|---|---|---|
| Frictional resistance test | Beginning of test | 2500000 | about 15 knots | 2.7% | 2.1% | 1.6% | 1.9% |
|  |  | 4000000 | about 25 knots | 2.4% | 1.9% | 1.5% | 2.1% |
|  | After immersion in seawater for 1 month | 2500000 | about 15 knots | 0.5% | −0.3% | −0.2% | −0.1% |
|  |  | 4000000 | about 25 knots | 0.2% | −0.4% | −0.4% | 0% |

It was found from Tables 8 and 9 that a coated film formed by using the coating composition obtained in examples exhibits excellent low friction performance and an effect of the low friction performance is maintained for a long term. And, the conditions of the surface of the coated film were also excellent.

INDUSTRIAL APPLICABILITY

By using the coating composition of the present invention, a coated film having low friction performance can be formed, and thereby the usage of energy in the marine vessel's navigation can be reduced to realize energy conservation and an environmental burden can be reduced through a reduction in emission of carbon dioxide.

The invention claimed is:

1. A coating composition for a vessel bottom comprising:
a resin binder containing a hydrolyzable resin;
an organic solvent; and
an organic polymer particle dispersed in said organic solvent;
wherein said organic polymer particle has the solubility at 23° C. in the artificial seawater specified in ASTM D1141-98 of 15 g/liter or less, the water-absorbing amount for the artificial seawater specified in ASTM D1141-98 of 0.01% by mass or more and a particle diameter of 0.05 to 100 µm, and wherein the organic polymer particle has a cationic group.

2. The coating composition according to claim 1,
wherein the content of the organic polymer particle is 0.01 to 15% by mass with respect to the solid matter of the coating composition.

3. The coating composition according to claim 1,
wherein said coating composition is an antifouling coating composition.

4. The coating composition according to claim 1, wherein said hydrolyzable resin contains at least one species of an acrylic resin and/or a polyester resin selected from the group consisting of a resin (I), a resin (II) and a resin (III),
wherein said resin (I) is an acrylic resin and/or a polyester resin having a side chain expressed by the following general formula (1);

wherein M is a divalent or higher valent metal and A is an organic acid residue of a monobasic acid,
wherein said resin (II) is an acrylic resin and/or a polyester resin having a side chain expressed by the following general formula (2);

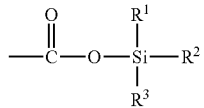

wherein $R^1$, $R^2$ and $R^3$ are the same or different from one another and represent an isopropyl group or a n-butyl group,
wherein said resin (III) is an acrylic resin and/or a polyester resin having at least one side chain expressed by said general formula (1) on the side chain and having at least one side chain expressed by said general formula (2) on the side chain.

5. The coating composition according to claim 1, wherein the organic polymer particle is a synthetic polymer.

6. The coating composition according to claim 5, wherein the organic polymer particle is an acrylic resin particle.

7. The coating composition according to claim 5, wherein the content of the organic polymer particle is 0.01 to 15% by mass with respect to the solid matter of the coating composition.

8. A coated film formed by using the coating composition according to claim 1.

9. A method of reducing friction in water, comprising a step of forming the coated film according to claim 8 on the surface of a substance to be coated.

10. A coating composition for a vessel bottom comprising:
a resin binder containing a hydrolyzable resin;
an organic solvent; and
an organic polymer particle dispersed in said organic solvent;
wherein said organic polymer particle has the solubility at 23° C. in the artificial seawater specified in ASTM D1141-98 of 15 g/liter or less, the water-absorbing amount for the artificial seawater specified in ASTM D1141-98 of 0.01% by mass or more and a particle diameter of 0.05 to 100 µm, and wherein said organic polymer particle is a composite resin particle consisting of a hydrophilic resin and an acrylic resin.

11. The coating composition according to claim 10,
wherein the hydrophilic resin is at least one species of hydrophilic resin selected from the group consisting of starch, pullulan, gum arabic, κ-carrageenan, gelatin, cellulose, chitosan and derivatives thereof, polyvinyl alcohol, polyallylamine, polyvinylamine, poly(meth)acrylamide, and poly(meth)acrylic acid and copolymer thereof.

12. The coating composition according to claim 10, wherein said hydrolyzable resin contains at least one species of an acrylic resin and/or a polyester resin selected from the group consisting of a resin (I), a resin (II) and a resin (III),
wherein said resin (I) is an acrylic resin and/or a polyester resin having a side chain expressed by the following general formula (1);

wherein M is a divalent or higher valent metal and A is an organic acid residue of a monobasic acid,
wherein said resin (II) is an acrylic resin and/or a polyester resin having a side chain expressed by the following general formula (2);

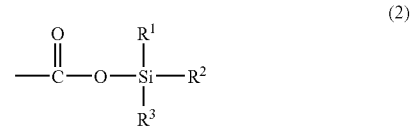

wherein $R^1$, $R^2$ and $R^3$ are the same or different from one another and represent an isopropyl group or a n-butyl group,
wherein said resin (III) is an acrylic resin and/or a polyester resin having at least one side chain expressed by said general formula (1) on the side chain and having at least one side chain expressed by said general formula (2) on the side chain.

13. A coating composition for a vessel bottom comprising:
a resin binder containing a hydrolyzable resin;
an organic solvent; and
an organic polymer particle dispersed in said organic solvent;
wherein said organic polymer particle has the solubility at 23° C. in the artificial seawater specified in ASTM D1141-98 of 15 g/liter or less, the water-absorbing amount for the artificial seawater specified in ASTM D1141-98 of 0.01% by mass or more and a particle diameter of 0.05 to 100 µm, and wherein the organic polymer particle is a nature-derived polymer having a crosslinking chain or at least one hydrophilic functional group selected from the group consisting of hydroxyl group, amino group, carboxyl group, amide group and polyoxyethylene group.

14. The coating composition according to claim 13, wherein the content of the organic polymer particle is 0.01 to 15% by mass with respect to the solid matter of the coating composition.

15. The coating composition according to claim 13, wherein said hydrolyzable resin contains at least one species of an acrylic resin and/or a polyester resin selected from the group consisting of a resin (I), a resin (II) and a resin (III),
wherein said resin (I) is an acrylic resin and/or a polyester resin having a side chain expressed by the following general formula (1);

—C(=O)—O-M-O—C(=O)-A        (1), wherein M is a divalent or higher valent metal and A is an organic acid residue of a monobasic acid,
wherein said resin (II) is an acrylic resin and/or a polyester resin having a side chain expressed by the following general formula (2);

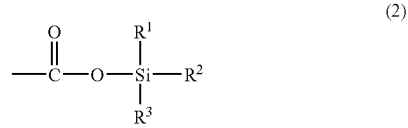

wherein $R^1$, $R^2$ and $R^3$ are the same or different from one another and represent an isopropyl group or a n-butyl group,
wherein said resin (III) is an acrylic resin and/or a polyester resin having at least one side chain expressed by said general formula (1) on the side chain and having at least one side chain expressed by said general formula (2) on the side chain.

16. A coating composition for a vessel bottom comprising:
a resin binder containing a hydrolyzable resin;
an organic solvent; and
an organic polymer particle dispersed in said organic solvent;
wherein said organic polymer particle has a particle diameter of 0.05 to 100 μm, and wherein said organic polymer particle is at least one species of an organic polymer particle selected from the group consisting of chitin, chitosan, γ-PGA, pulverized silk and derivatives thereof.

17. The coating composition according to claim 16, wherein the content of the organic polymer particle is 0.01 to 15% by mass with respect to the solid matter of the coating composition.

18. The coating composition according to claim 16, wherein said hydrolyzable resin contains at least one species of an acrylic resin and/or a polyester resin selected from the group consisting of a resin (I), a resin (II) and a resin (III),
wherein said resin (I) is an acrylic resin and/or a polyester resin having a side chain expressed by the following general formula (1);

—C(=O)—O-M-O—C(=O)-A        (1), wherein M is a divalent or higher valent metal and A is an organic acid residue of a monobasic acid,
wherein said resin (II) is an acrylic resin and/or a polyester resin having a side chain expressed by the following general formula (2);

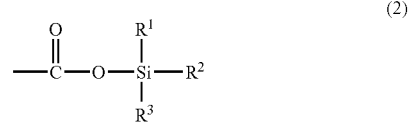

wherein $R^1$, $R^2$ and $R^3$ are the same or different from one another and represent an isopropyl group or a n-butyl group,
wherein said resin (III) is an acrylic resin and/or a polyester resin having at least one side chain expressed by said general formula (1) on the side chain and having at least one side chain expressed by said general formula (2) on the side chain.

* * * * *